United States Patent [19]
Elder

[11] Patent Number: 5,605,009
[45] Date of Patent: Feb. 25, 1997

[54] PROTECTIVE COVERING FOR PLANTS AND TREES

[76] Inventor: Charles R. Elder, P.O. Box 217, Venetia, Pa. 15367-0217

[21] Appl. No.: 501,200

[22] Filed: Jul. 11, 1995

[51] Int. Cl.$^6$ ................................................. A01G 17/00
[52] U.S. Cl. ........................................ 47/25; 47/84
[58] Field of Search .................... 47/25 R, 84 C, 47/84 BC, 25

[56] References Cited

U.S. PATENT DOCUMENTS

| | | | |
|---|---|---|---|
| 921,484 | 5/1909 | Turner | 47/25 R |
| 2,822,644 | 2/1958 | Berger | 47/25 R |
| 5,323,557 | 6/1994 | Sonntag | 47/25 R |

FOREIGN PATENT DOCUMENTS

| | | | |
|---|---|---|---|
| 1465465 | 10/1965 | France | 47/25 R |
| 2518441 | 11/1976 | Germany | 47/25 R |
| 588841 | 2/1959 | Italy | 47/25 R |
| 769868 | 3/1957 | United Kingdom | 47/25 R |
| 2053640 | 2/1981 | United Kingdom | 47/25 |

*Primary Examiner*—Terry Lee Melius
*Assistant Examiner*—Joanne C. Downs
*Attorney, Agent, or Firm*—Douglas G. Glantz

[57] ABSTRACT

A flat, flexible protective covering (10) having a center cavity (12), and a slot (14), that runs from the center cavity (12) to the outside diameter (16) of material, with a plurality of holes (18) connected by grooves (20).

16 Claims, 1 Drawing Sheet

5,605,009

PROTECTIVE COVERING FOR PLANTS AND TREES

BACKGROUND

1. Field of Invention

This invention relates to plants and trees, specifically a protective covering from undesirable elements and the environment 2. Description of Prior Art Heretofore, there has always been a problem protecting plants and trees from life-threatening elements and the environment such as root digging pets and animals, small children playing and digging in house plants, accidents, weather, and garden killing weeds. After years of research, I found that there was no single product to address these problems. I then developed a protective covering, which alleviates all of these problems.

OBJECTS AND ADVANTAGES

Accordingly, several objects and advantages of my invention are, (a) to provide a protective covering, used indoors and out, that deters digging pets, pests, and varmints;

(b) to provide a protective covering that centers plants and trees in their containers;

(c) to provide a protective covering that limits plant spillage due to accidents, elements, and mishaps;

(d) to provide a protective covering that distributes water proportionally throughout the growing area through distribution channels such as shown by grooves 20 as shown in FIG. 2;

(e) to provide a protective covering that can be made to fit any size container or area;

(f) to provide a protective covering that limits weed growth and cross seeding; and (g) to provide a protective covering that is environmentally safe and reusable.

Further objects and advantages will become apparent from a consideration of the following description and drawings.

DRAWING FIGURES

Figure 1:
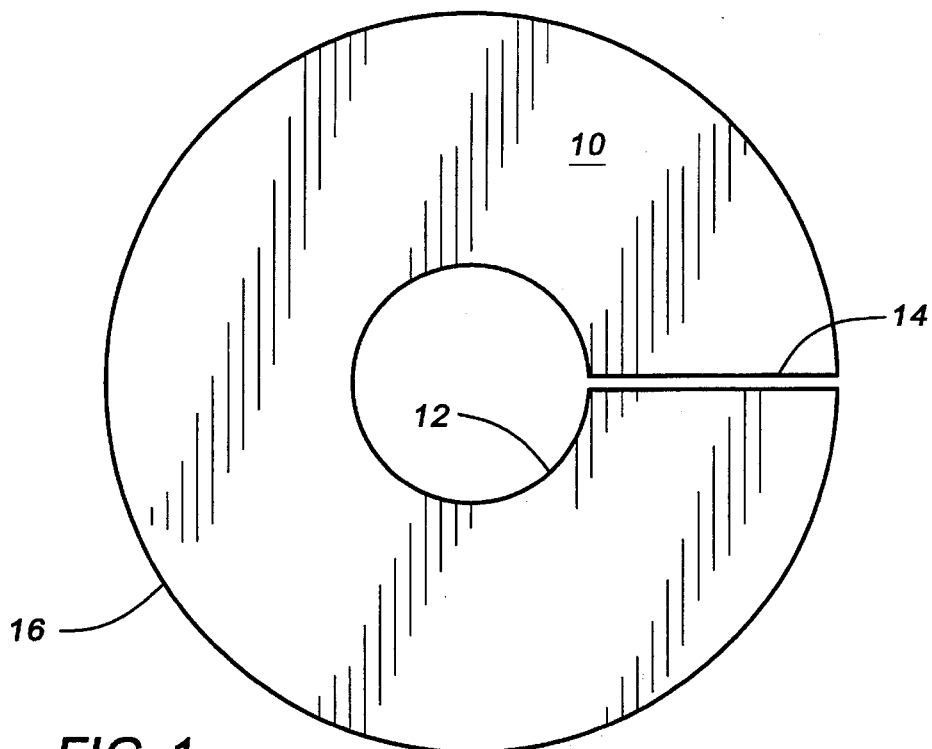
FIG. 1 shows a protective covering comprising of a flexible material to be made workable, a center cavity, with a slot running from said cavity, to the outside diameter of the protective covering.

| Reference Numerals In Drawings | |
| --- | --- |
| 10 protective covering | 12 center cavity |
| 14 slot | 16 outside diameter |
| 18 plurality of holes | 20 grooves |

DESCRIPTION OF INVENTION

FIG. 1 shows a protective covering 10, with a center cavity 12, and a slot 14, running from center cavity 12, to the outside diameter 16 of material.

Figure 2:
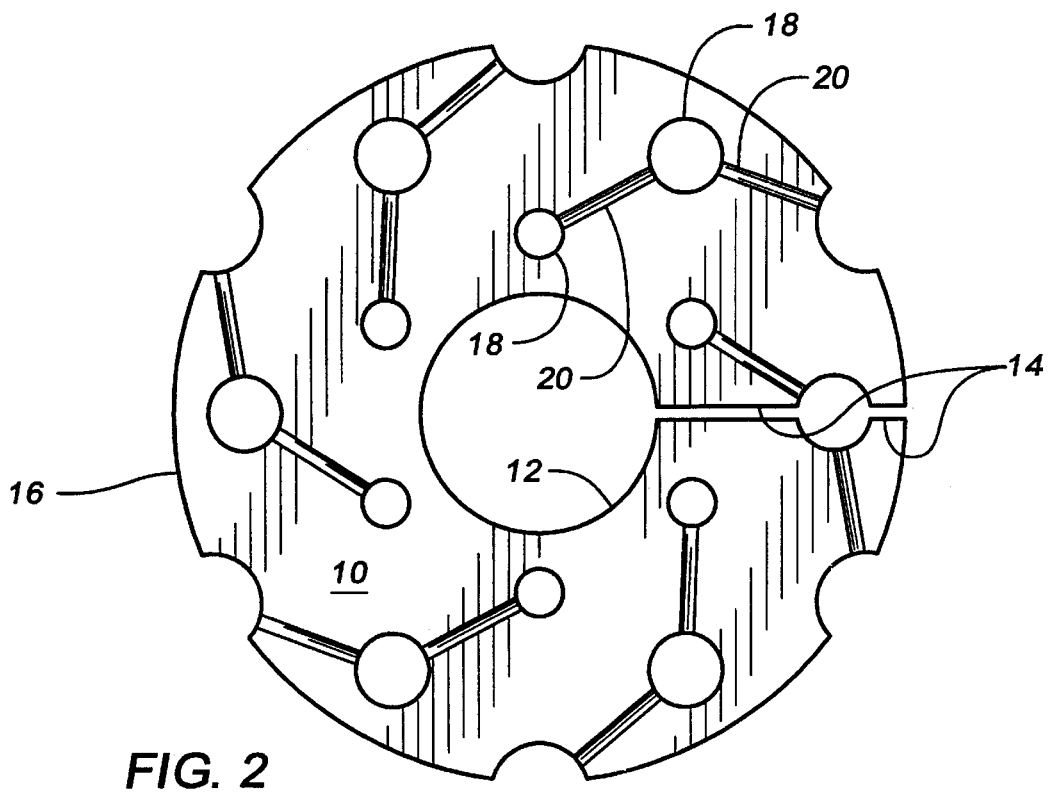
FIG. 2 shows the finished protective covering with a slot running from the center cavity to the outside diameter of the protective covering, and a plurality holes connected by grooves.

FIG. 2 shows the finished protective covering 10, having center cavity 12, and a slot 14, running from center cavity 12, to the outside diameter of material 16, and a plurality of holes 18 connected by grooves 20.

OPERATION OF INVENTION

The then completed protective covering is separated at the slot 14, and fit to the base of a plant or tree, aligning the center cavity 12 around the stem or trunk.

SUMMARY

Accordingly, one may easily see that by employing this product to a plant or tree base, that it will act as a protective covering, deterring digging pets, pests, and varmints, indoors and out.

It also centers plants and trees in their containers simply by fitting protective covering 10, to a container first, then fitting plant or tree to protective covering 10.

It limits plant spillage due to accidents, and elements, by fitting securely onto the top of container.

It distributes water evenly throughout the growing area, due to a plurality of sized holes 18, connected by grooves 20.

It can be made to fit any size growing area or container.

It limits weed growth in the garden or around the house.

It is environmentally safe and reusable.

I claim:

1. A protective cover for plants and trees, comprising:

(a) a flexible thin disc, wafer-shaped cover having a substantially centrally located center cavity for receiving a base of plants and trees;

(b) a slot running from said center cavity to the outside diameter of said cover;

(c) a plurality of large holes in said cover; and (d) grooves in said cover connecting said large holes, wherein said large holes are sized in increasing diameters from the center cavity outward and said grooves connect said large holes having increasing diameters.

2. A protective cover as set forth in claim 1, wherein said grooves connect said large holes in a spiral around said center cavity, thereby increasing the distance between said large holes on said grooves.

3. A protective cover as set forth in claim 1, wherein said large holes are sized in increasing diameters from about one-half (½) inch in diameter to about one (1) inch in diameter.

4. A protective cover as set forth in claim 3, wherein said large holes are sized in three increasing diameters of about one-half (½) inch in diameter, about three-quarters (¾) inch in diameter, and about one (1) inch in diameter.

5. A protective cover as set forth in claim 3, wherein said large holes are sized in increasing diameters from the center cavity outward and said grooves connect said large holes having increasing diameters.

6. A protective cover as set forth in claim 5, wherein said grooves are positioned in a spiral around said center cavity, thereby increasing the distance between said large holes on said grooves.

7. A protective cover as set forth in claim 6, wherein said center cavity is sized at about 2½ inches in diameter.

8. A protective cover as set forth in claim 7, wherein said flexible wafer-shaped cover is composed of a hard plastic material.

9. A method of covering and protecting the base of plants and trees, comprising:

(a) providing a flexible thin disc, wafer-shaped cover having a substantially centrally located center cavity for receiving a base of plants and trees;

(b) placing said cover around the base of a plant or tree by inserting said plant or tree base through a slot running from said center cavity to the outside diameter of said cover;

(c) channeling water away from said plant or tree base and distributing said water to roots of the plant or tree through a plurality of large holes in said cover, wherein said channeling comprises channeling water away from said plant or tree base through grooves in said cover connecting said large holes and wherein said large holes are sized in increasing diameters from the center cavity outward.

10. A method of covering and protecting the base of plants and trees as set forth in claim 9, wherein said channeling comprises channeling water away from said plant or tree base through said grooves arranged in a spiral around said center cavity, thereby increasing the distance between said large holes on said grooves.

11. A method of covering and protecting the base of plants and trees as set forth in claim 9, wherein said channeling comprises channeling water away from said plant or tree base through said large holes sized in increasing diameters from about one-half (½) inch in diameter to about one (1) inch in diameter.

12. A method of covering and protecting the base of plants and trees as set forth in claim 11, wherein said channeling comprises channeling water away from said plant or tree base through said large holes sized in three increasing diameters of about one-half (½) inch in diameter, about three-quarters (¾) inch in diameter, and about one (1) inch in diameter.

13. A method of covering and protecting the base of plants and trees as set forth in claim 12, wherein said channeling comprises channeling water away from said plant or tree base through said large holes sized in increasing diameters from the center cavity outward.

14. A method of covering and protecting the base of plants and trees as set forth in claim 13, wherein said channeling comprises channeling water away from said plant or tree base through said grooves positioned in a spiral around said center cavity, thereby increasing the distance between said large holes on said grooves.

15. A method of covering and protecting the base of plants and trees as set forth in claim 14, wherein said center cavity is sized at about 2½ inches in diameter.

16. A method of covering and protecting the base of plants and trees, comprising:

(a) providing a flexible thin disc, wafer-shaped plastic cover having a substantially centrally located center cavity for receiving the base of plants and trees;

(b) placing said cover around the base of a plant or tree by inserting said plant or tree base through a slot running from said center cavity to the outside diameter of said cover;

(c) channeling water away from said plant or tree base and distributing through a plurality of large holes sized in increasing diameters from about one-half (½) inch in diameter to about one (1) inch in diameter from the center cavity outward in said cover through grooves arranged in a spiral around said center cavity, said grooves in said cover connecting said large holes; and (d) distributing water proportionally around said base of plants and trees and limiting weed growth and cross-seeding thereby.

* * * * *